United States Patent
Takahashi et al.

(10) Patent No.: US 11,277,716 B2
(45) Date of Patent: Mar. 15, 2022

(54) EFFECTIVE COMMUNICATION OF MESSAGES BASED ON INTEGRATION OF MESSAGE FLOWS AMONG MULTIPLE SERVICES

(71) Applicant: FUJITSU LIMITED, Kawasaki (JP)

(72) Inventors: Eiichi Takahashi, Kawasaki (JP); Hisatoshi Yamaoka, Kawasaki (JP); Kota Itakura, Kawasaki (JP); Miwa Okabayashi, Sagamihara (JP); Akira Shiba, Kawasaki (JP); Kazuki Matsui, Kawasaki (JP); Tatsuro Matsumoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/843,171

(22) Filed: Apr. 8, 2020

(65) Prior Publication Data
US 2020/0329349 A1    Oct. 15, 2020

(30) Foreign Application Priority Data
Apr. 11, 2019    (JP) .............................. JP2019-075365

(51) Int. Cl.
| H04W 4/00 | (2018.01) |
| H04W 4/12 | (2009.01) |
| H04L 51/066 | (2022.01) |
| H04L 51/58 | (2022.01) |
| H04L 51/23 | (2022.01) |

(52) U.S. Cl.
CPC ............. H04W 4/12 (2013.01); H04L 51/066 (2013.01); H04L 51/30 (2013.01); H04L 51/38 (2013.01)

(58) Field of Classification Search
None
See application file for complete search history.

(56) References Cited

U.S. PATENT DOCUMENTS

2015/0128150 A1    5/2015   Ueda et al.

FOREIGN PATENT DOCUMENTS

| JP | H07-282011 A | 10/1995 |
| JP | 2006-031238 A | 2/2006 |
| JP | 2010-097489 A | 4/2010 |
| JP | 2015-095096 A | 5/2015 |
| WO | 2014/020735 A1 | 2/2014 |

*Primary Examiner* — San Htun
*Assistant Examiner* — Alexander J Yi
(74) *Attorney, Agent, or Firm* — Fujitsu Patent Center

(57) ABSTRACT

An apparatus performs transmission and reception of messages via which a plurality of services coordinate with each other in a message control system. The apparatus integrates a plurality of messages into a first message, based on relationships between message transmission and message reception caused by the plurality of services, and transmits the first message to another information processing device in the message control system. The apparatus receives a second message integrated by another information processing device, and decompose the received second message into messages including a third message. The apparatus further integrates the decomposed third message and a fourth message into a fifth message, and transfers the integrated fifth message to another information processing device.

18 Claims, 25 Drawing Sheets

FIG. 11

- SERVICE ID
    - RECEPTION: (TRANSMISSION SERVICE ID, DATA ID), (TRANSMISSION SERVICE ID, DATA ID), ...
    - TRANSMISSION: DATA ID, DATA ID, ...

FIG. 12

```
· MESSAGE PROCESSING SECTION ID
    · MESSAGE INTEGRATION INSTRUCTION
    · MESSAGE INTEGRATION INSTRUCTION
    · . . .
· MESSAGE PROCESSING SECTION ID
    · MESSAGE INTEGRATION INSTRUCTION
    · . . .
· . . .
```

FIG. 15

- SERVICE ID, MESSAGE PROCESSING SECTION ID
- SERVICE ID, MESSAGE PROCESSING SECTION ID
- . . .

FIG. 16

- DATA ID, INTEGRATION DESTINATION DATA ID, INTEGRATION DATA ID
- DATA ID, INTEGRATION DESTINATION DATA ID, INTEGRATION DATA ID
- . . .

FIG. 18

- MESSAGE TYPE
- MESSAGE BODY

FIG. 19

- NORMAL MESSAGE
- DATA

FIG. 20

- INTEGRATED MESSAGE
- DATA, RECEPTION DESIGNATION, TRANSFER DESIGNATION
- DATA, RECEPTION DESIGNATION, TRANSFER DESIGNATION
- . . .

FIG. 23

- DATA ID, INTEGRATION DESTINATION DATA ID, INTEGRATION DATA ID
  (DESTINATION SERVICE ID)
- . . .

FIG. 24

- INTEGRATED MESSAGE
    - DATA, RECEPTION DESIGNATION, TRANSFER DESIGNATION
      (DESTINATION SERVICE ID)
    - . . .

EFFECTIVE COMMUNICATION OF MESSAGES BASED ON INTEGRATION OF MESSAGE FLOWS AMONG MULTIPLE SERVICES

CROSS-REFERENCE TO RELATED APPLICATION

This application is based upon and claims the benefit of priority of the prior Japanese Patent Application No. 2019-75365, filed on Apr. 11, 2019, the entire contents of which are incorporated herein by reference.

FIELD

The embodiment discussed herein is related to effective communication of messages based on integration of message flows among multiple services.

BACKGROUND

In recent years, in a cloud service, a service is built on a distributed system that is referred to as a microservice architecture in many cases. Many of microservices are small services, each of which has a single function such as a search function or an authentication function. A service is built by combining a plurality of microservices.

For example, an internet sales service is built by combining five microservices, which are a web interface service, an authentication service, a search service, a shopping service, and a database service in some cases.

As a method of combining microservices, messaging is widely used. The messaging is a method of causing services to communicate a message with each other and coordinate with each other. The messaging is suitable for asynchronous execution in which a message transmitter executes a next process without waiting for message reception by a message receiver.

For example, a room environment service composed of a room temperature monitoring microservice and an air conditioner control microservice is assumed.

The room temperature monitoring microservice converts room temperature information acquired from a temperature sensor into message data in a predetermined format and transmits the message data to the air conditioner control microservice. The room temperature monitoring microservice transmits next temperature information immediately after acquiring the next temperature information, regardless of whether the air conditioner control microservice processes the transmitted message. The transmitted message is stored in a buffer that is referred to as a queue.

The air conditioner control microservice extracts the message from the queue and repeatedly executes a process based on details of the message. For example, upon extracting the message indicating a room temperature of 30 degrees Celsius, the air conditioner control microservice turns on an air conditioner.

Examples of the related art are Japanese Laid-open Patent Publication No. 07-282011 and Japanese Laid-open Patent Publication No. 2006-31238.

SUMMARY

According to an aspect of the embodiments, an apparatus performs transmission and reception of messages via which a plurality of services coordinate with each other in a message control system. The apparatus integrates a plurality of messages into a first message, based on relationships between message transmission and message reception caused by the plurality of services, and transmits the first message to another information processing device in the message control system. The apparatus receives a second message integrated by another information processing device, and decomposes the received second message into messages including a third message. The apparatus further integrates the decomposed third message and a fourth message into a fifth message, and transfers the integrated fifth message to another information processing device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 illustrates a table exemplifying communication specifications of a service in the message control system illustrated in FIG. 1;

FIG. 12 illustrates a table indicating message integration instruction information in the message control system illustrated in FIG. 1;

FIG. 15 illustrates a table exemplifying association management information in the message control system illustrated in FIG. 1;

FIG. 16 illustrates a table indicating details of a message integration instruction in the message control system illustrated in FIG. 1;

FIG. 18 illustrates a table indicating a message in the message control system illustrated in FIG. 1;

FIG. 19 illustrates a table indicating a normal message in the message control system illustrated in FIG. 1;

FIG. 20 illustrates a table indicating an integrated message in the message control system illustrated in FIG. 1;

FIG. 23 illustrates a table indicating details of a message integration instruction in the case where a plurality of transmission destinations exist in the message control system illustrated in FIG. 1;

FIG. 24 illustrates a table indicating an integrated message in the case where the plurality of transmission destinations exist in the message control system illustrated in FIG. 1.

DESCRIPTION OF EMBODIMENTS

Figure 1:
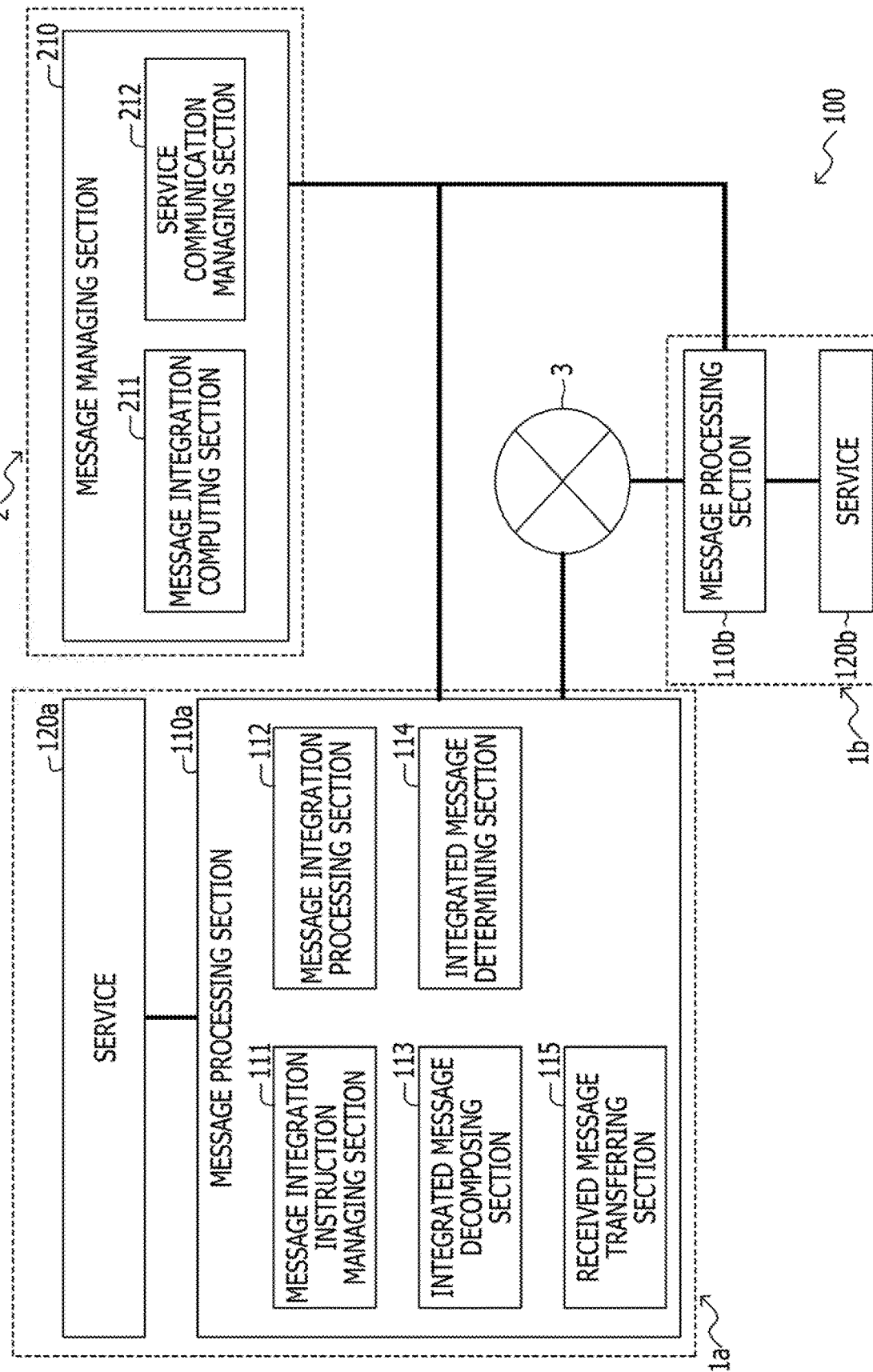
FIG. 1 is a block diagram schematically illustrating an example of a configuration of a message control system according to an example of an embodiment.

In a cloud service for vehicles, home appliances, and various sensors that are coupled to the internet, as the number of products targeted for the service is larger, a higher added value is able to be provided to users. For example, when a large number of vehicles are targeted for a service, the service may be provided based on not only simple route searches based on map information but also traffic congestion detection and forecast.

To increase the number of products targeted for a service, a large number of microservices, such as a microservice for enabling targets for the service to communicate data with each other and a microservice for collecting data from the targets for the service and executing various analysis on the data, are deployed. Messaging is executed between a large number of microservices a large number of times.

For example, in a service for one million vehicles, real-time messaging is executed one million times. When another service is newly added, the real-time messaging is further executed one million times. The number of times that messaging is executed is generally larger than the number of microservices.

The cost of messaging is generally the total of costs of processes (for example, a transmission process, a data transfer process, a routing process, a data transfer process, and a reception process) from transmission to reception. For example, the cost of the transmission process is defined based on the allocation of a transmission buffer and the establishment of a communication path with a receiver. The cost of the data transfer processes is defined based on the size of transfer data and a delay determined based on a transfer speed. The cost of the routing process is defined based on the selection of an appropriate path to the receiver and transfer order control based on a timestamp, a priority, and the like. The cost of the reception process is defined based on queuing of received data items and waiting for the received data items. In each of the processes, a delay occurs and computation resources such as a central processing unit (CPU) and a storage device are used.

As described above, when the number of targets for a service increases, an increase in the number of times that messaging is executed is larger than an increase in the number of services. Therefore, an increase in the cost that is caused by the increase in the number of times that the messaging is executed may be a bottleneck.

In an aspect, it is desirable to reduce the cost of messaging.

Hereinafter, an embodiment is described with reference to the drawings. The following embodiment is merely an example and is not intended to exclude the application of various modifications and techniques not explicitly described in the embodiment. For example, the present embodiment may be variously modified and changed without departing from the gist of the embodiment.

The drawings are not intended to include only constituent elements illustrated in the drawings and may include other functions and the like.

Hereinafter, the same reference signs indicate the same or similar components in the drawings, and duplicate description thereof is omitted.

[A] Example of Embodiment

[A-1] Example of System Configuration

FIG. 1 is a block diagram schematically illustrating an example of a configuration of a message control system 100 according to an example of the embodiment. The message control system 100 may be configured to include a message managing device 2 and a plurality of message processing devices 1. In FIG. 1, two message devices 1a and 1b are illustrated as an example, but the number of message processing devices is not limited to two and may be three or more.

The message control system 100 causes a plurality of services 120a, 120b to transmit and receive a message to and from each other and coordinate with each other and has functions as a message managing section 210 and a plurality (2 in the example illustrated in FIG. 1) of message processing sections 110a, 110b. Hereinafter, any one of a plurality of services (for example, 120a and 120b in FIG. 1) will be representatively expressed as a service 120, and any one of a plurality of message processing sections (for example, 110a and 110b in FIG. 1) will be representatively expressed as a message processing section 110.

The message managing section 210 is coupled to and able to communicate with the message processing sections 110a, 110b. The message managing section 210 generates a message integration instruction based on communication specifications of a service 120 in the deployment of the service 120 and transmits the generated message integration instruction to a message processing section 110 corresponding to the service 120.

For example, the message managing section 210 instructs a message processing section 110 to integrate a plurality of messages into a single message based on relationships between message transmission and reception by the services 120 and transmit the integrated message to another message processing section 110.

Functions of the message managing section 210 are enabled by a message managing device 2, as described later with reference to FIG. 2. The message managing section 210 functions as a message integration computing section 211 and a service communication managing section 212, as illustrated in FIG. 1.

The message integration computing section 211 computes a set of service identifiers (IDs) to be transmitted to the services 120, based on communication specifications of the services 120.

The service communication managing section 212 manages the communication specifications of the services 120.

The message processing sections 110 are installed for the respective services 120 and relay message communication between the services 120 via a network 3. Each of the message processing sections 110 executes a process on an integrated message in accordance with an instruction from the message managing section 210. Functions of the message processing sections 110 are enabled by a message processing device 1, as described later with reference to FIG. 2. Each of the message processing sections 110 functions as a message integration instruction managing section 111, a message integration processing section 112, an integrated message decomposing section 113, an integrated message determining section 114, and a received message transferring section 115, as illustrated in FIG. 1.

The message integration instruction managing section 111 receives a message integration instruction from the message managing section 210 and holds the received message integration instruction.

When a message integration instruction corresponding to a message exists, the message integration processing section 112 generates an integrated message. On the other hand, when the message integration instruction corresponding to the message does not exist, the message integration processing section 112 treats the message as a normal message that is not to be integrated.

The message integration processing section 112 is an example of a transmitter. For example, the message integration processing section 112 integrates a plurality of messages into a single message based on the relationships between the message transmission and reception by the services 120 and transmits the integrated message to another message processing device 1. The message integration processing section 112 integrates decomposed messages and a new message into a message and transfers the integrated message to the other message processing device 1.

The integrated message decomposing section 113 extracts data, a reception designation, and a transfer designation from a message body of a message. When the reception designation in the message body indicates true, the integrated message decomposing section 113 gives the data to the received message transferring section 115. On the other hand, when the transfer designation in the message body indicates true, the integrated message decomposing section 113 gives the data to the message integration processing section 112.

For example, the integrated message decomposing section 113 is an example of a receiver and receives and decomposes a message integrated by the other message processing devices 1.

The integrated message determining section 114 determines whether a message received from the network 3 is an integrated message or a normal message. When the received message is the normal message, the integrated message determining section 114 gives the received message to the received message transferring section 115. On the other hand, when the received message is the integrated message, the integrated message determining section 114 gives the received message to the integrated message decomposing section 113.

The received message transferring section 115 gives the data extracted from the message body to one or more of the services 120.

Figure 2:
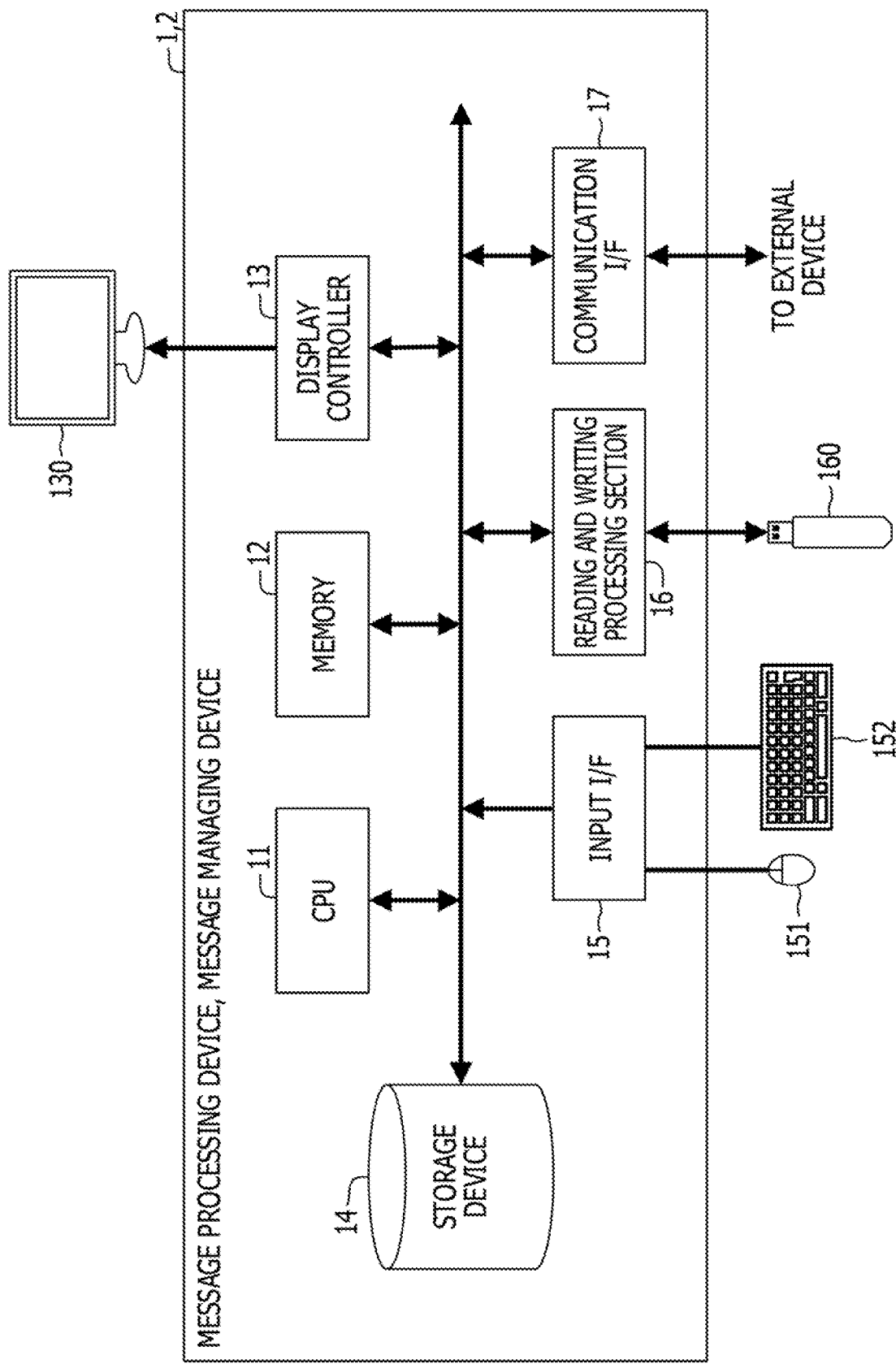
FIG. 2 is a block diagram schematically illustrating an example of a hardware configuration of each of a message processing device illustrated in FIG. 1 and a message managing device illustrated in FIG. 1.

FIG. 2 is a block diagram schematically illustrating an example of a hardware configuration of the message processing device 1 illustrated in FIG. 1 and the message managing device 2 illustrated in FIG. 1.

Each of the message processing device 1 and the message managing device 2 includes a CPU 11, a memory 12, a display controller 13, a storage device 14, an input interface (I/F) 15, a reading and writing processing section 16, and a communication I/F 17. The message processing device 1 is an example of an information processing device. The message managing device 2 is an example of a control device.

The memory 12 is an example of a storage section. The memory 12 is, for example, a storage device including a read-only memory (ROM) and a random-access memory (RAM). A program such as a basic input and output system (BIOS) may be written to the ROM of the memory 12. The software program of the memory 12 may be appropriately read into and executed by the CPU 11. The RAM of the memory 12 may be used as a primary recording memory or a working memory.

The display controller 13 is coupled to a display device 130 and controls the display device 130. The display device 130 is a liquid crystal display, an organic light-emitting diode (OLED) display, a cathode ray tube (CRT), an electronic paper display, or the like and displays various information to an operator or the like. The display device 130 may be integrated with an input device and may be a touch panel, for example.

The storage device 14 is, for example, a device that reads, writes, and stores data. For example, as the storage device 14, a hard disk drive (HDD), a solid state drive (SSD), or a storage class memory (SCM) may be used.

The input I/F 15 is coupled to input devices such as a mouse 151 and a keyboard 152 and controls the input devices such as the mouse 151 and the keyboard 152. The mouse 151 and the keyboard 152 are examples of an input device. The operator performs various input operations via these input devices.

A recording medium 160 may be attached to the reading and writing processing section 16. In a state in which the recording medium 160 is attached to the reading and writing processing section 16, the reading and writing processing section 16 may read information stored in the recording medium 160. In this example, the recording medium 160 has portability. For example, the recording medium 160 is a flexible disk, an optical disc, a magnetic disk, a magneto-optical disc, a semiconductor memory, or the like.

The communication I/F 17 enables communication with an external device.

The CPU 11 is a processing unit that executes various control and computation. The CPU 11 enables various functions by executing the operating system (OS) stored in the memory 12 and a program stored in the memory 12.

A device for controlling operations of the entire message processing device 1 and the entire message managing device 2 is not limited to the CPU 11 and may be any one of an MPU, a DSP, an ASIC, a PLD, and an FPGA. The device for controlling the operations of the entire message processing device 1 and the entire message managing device 2 may be a combination of two or more of the CPU, the MPU, the DSP, the ASIC, the PLD, and the FPGA. The MPU is an abbreviation for microprocessor unit. The DSP is an abbreviation for digital signal processor. The ASIC is an abbreviation for application specific integrated circuit. The PLD is an abbreviation for programmable logic device. The FPGA is an abbreviation for field-programmable gate array.

Figure 3:
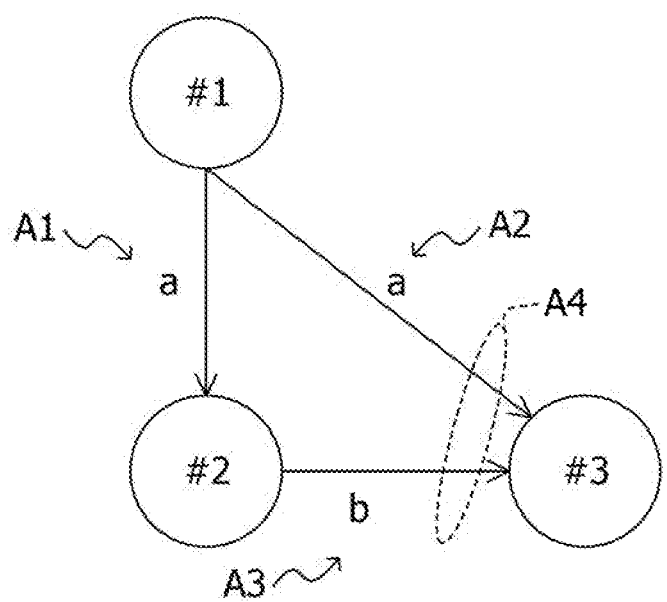
FIG. 3 is a diagram exemplifying messaging according to a related example.

FIG. 3 is a diagram exemplifying messaging according to a related example.

In the example illustrated in FIG. 3, services #1 to #3 are deployed. The service #1 acquires a position a of a vehicle. The service #2 calculates a velocity b of the vehicle. The service #3 determines a driving quality of the vehicle.

As indicated by reference signs A1 and A2, the service #1 transmits the acquired position a of the vehicle to each of the services #2 and #3.

As indicated by reference sign A3, the service #2 transmits, to the service #3, the velocity b of the vehicle that has been calculated based on the received position a of the vehicle.

As indicated by reference sign A4, the service #3 determines the driving quality of the vehicle based on the position a, received from the service #1, of the vehicle and the velocity b, received from the service #2, of the vehicle.

In this example, the service #2 acquires the position a of the vehicle from the service #1. Thus, in the case where the service #2 transfers the position a of the vehicle to the service #3, the service #1 may not communicate with the service #3. In the case where the service #2 transmits the position a of the vehicle together with the result of calculating the velocity b of the vehicle to the service #3, synchronization may not be executed between the service #1 and the service #3.

Every time a new service 120 that uses an existing service 120 is added to the system, the amount of useless communication between the services 120 may increase.

Figure 4:
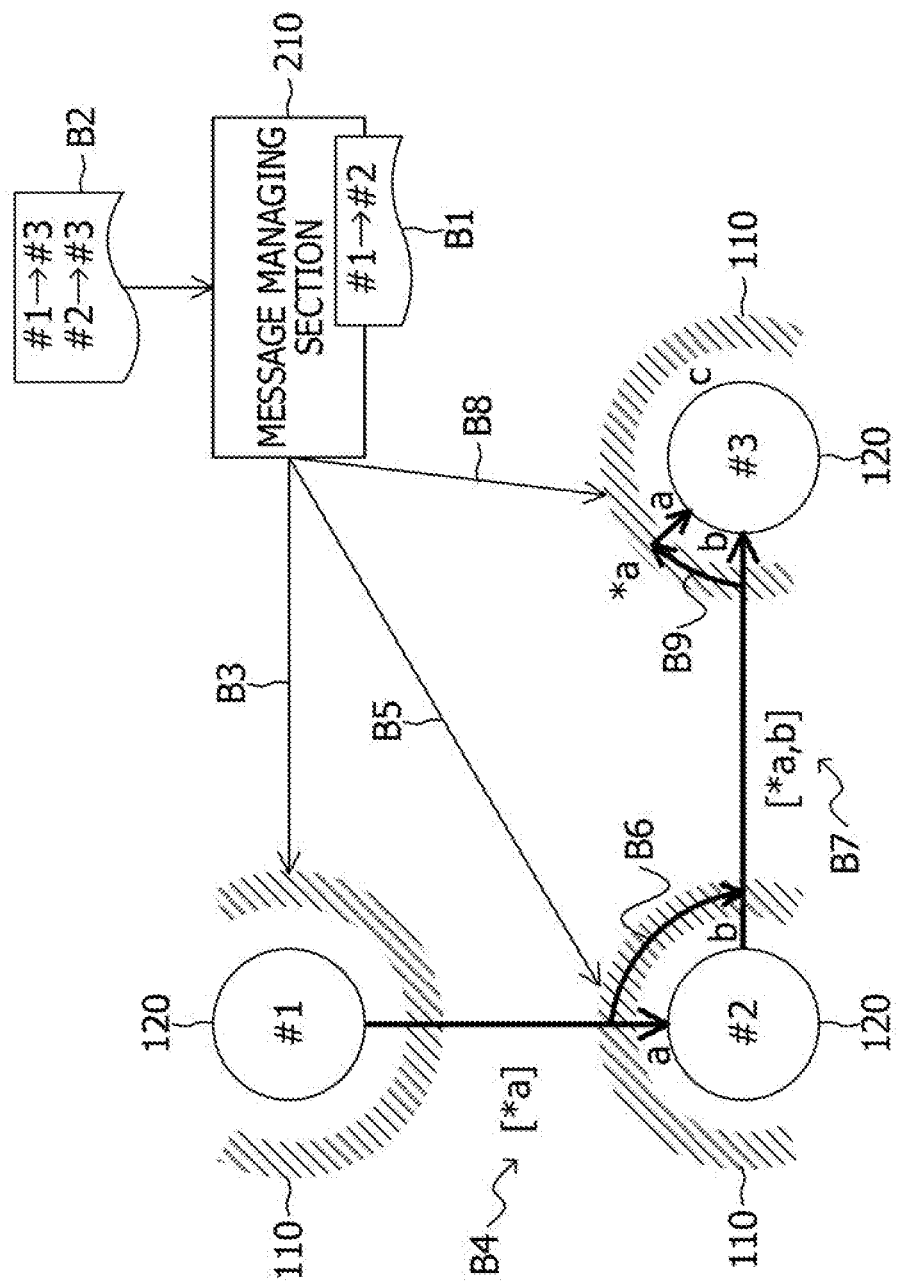
FIG. 4 is a diagram describing messaging in the message control system illustrated in FIG. 1.

FIG. 4 is a diagram describing messaging in the message control system 100 illustrated in FIG. 1.

In the example of the present embodiment, a single integrated message obtained by integrating a plurality of messages is introduced and data is input and output to and from the services 120 via the message processing sections 110 that process the integrated message.

The message managing section 210 optimizes a message flow (or the relationships between the transmission and the reception) to a newly deployed service 120 based on message flows to all the deployed services 120.

In the example illustrated in FIG. 4, the service #3 is newly deployed as well as the existing services #1 and #2. The message managing section 210 receives the registration of a message flow (indicated by reference sign B2) from the service #1 to the service #3 and a message flow (indicated by reference sign B2) from the service #2 to the service #3, as well as a message flow (indicated by reference sign B1) from the service #1 to the service #2.

As indicated by reference sign 63, the message managing section 210 instructs the message processing section 110 for the service #1 to treat a message a from the service #1 as a message to be integrated.

As indicated by reference sign 64, the message processing section 110 for the service #1 transmits the message [*a] to be integrated to the service #2. In this case, * indicates a target to be integrated.

As indicated by reference sign 65, the message managing section 210 instructs the message processing section 110 for the service #2 to receive the message a from the service #1 and transfer the message a to the service #3.

As indicated by reference signs B6 and 87, the message processing section 110 for the service #2 integrates the message a and a message b into a message [*a, b] and transmits the integrated message [*a, b] to the service #3.

As indicated by reference sign 88, the message managing section 210 instructs the message processing section 110 for the service #3 to receive the integrated message [*a, b] from the service #2.

As indicated by reference sign 89, the message processing section 110 for the service #3 generates a message c from the messages a and b received from the service #2.

Figure 5:
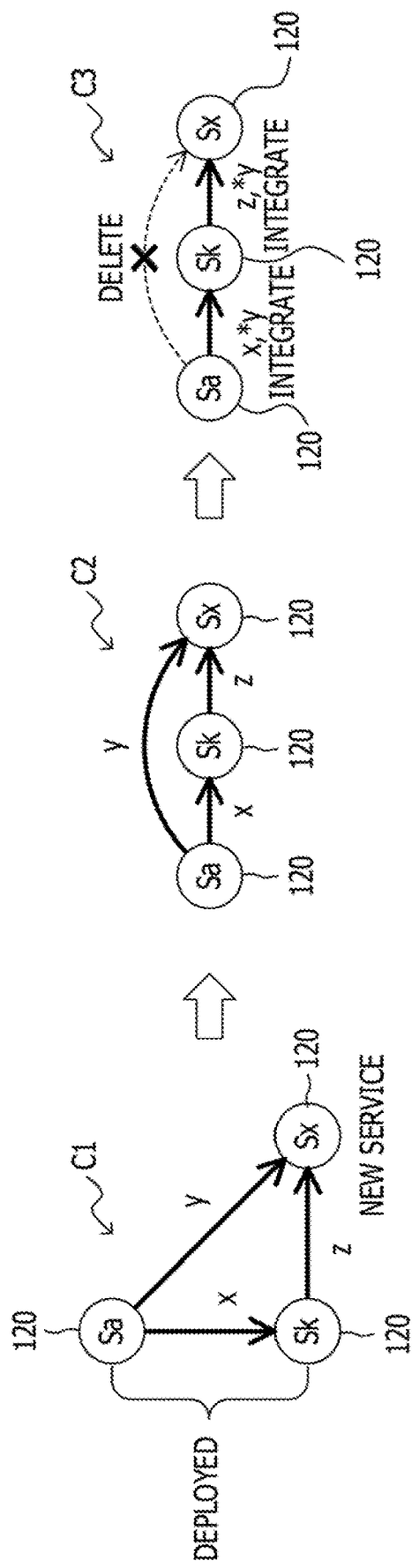
FIG. 5 is a diagram describing a change in a path in messaging executed in the message control system illustrated in FIG. 1.

FIG. 5 is a diagram describing a change in a path in messaging executed in the message control system 100 illustrated in FIG. 1.

A set of deployed services is D={Si|Si indicates the deployed services}. A set of upstream services of each Si is Ui={Sj|Sj indicates the services that transmit a message to Si}. For each Si, the set Ui is calculated from the relationships between the message transmission and the message reception.

As indicated by reference sign C1, a new service additionally deployed is Sx, a set of upstream services of the new service Sx is Ux={Sk|Sk indicates the services that transmit a message to Sx}, and message integration is executed for each of the services Sk.

When a service Sk is not deployed, the foregoing procedure is executed on the service Sk. On the other hand, when the service Sk is already deployed, the following processes (1) and (2) are executed on Sa that is an element included in a set Uk of upstream services of the service Sk.

(1) When Sx receives the same data x as Sk from Sa, x is treated as a message to be integrated and communication Pax from Sa to Sx is set so that the communication Pax is able to be deleted.

(2) When data x received by Sx is different from data y received by Sx as indicated by reference sign C2, y is treated as a message to be integrated, and the communication Pax from Sa to Sx is set so that the communication Pax is able to be integrated with communication Pak from Sa to Sk as indicated by reference sign C3.

For each of elements Sk of Ux, Sx is deployed based on an instruction to a corresponding message processing section 110. When transmission data to be transmitted from Sk to Sx is included in a message to be integrated, the message processing section 110 is instructed to integrate the message including the transmission data with another message. When communication Pkx from Sk to Sx is set so that the communication Pkx is able to be deleted, the message processing section 110 is instructed to delete Pkx. When the communication Pkx from Sk to Sx is set so that the communication Pkx is able to be integrated with communication Pkl, the message processing section 110 is instructed to delete Pkx and integrate data of Pkx with Pkl.

Figure 6:
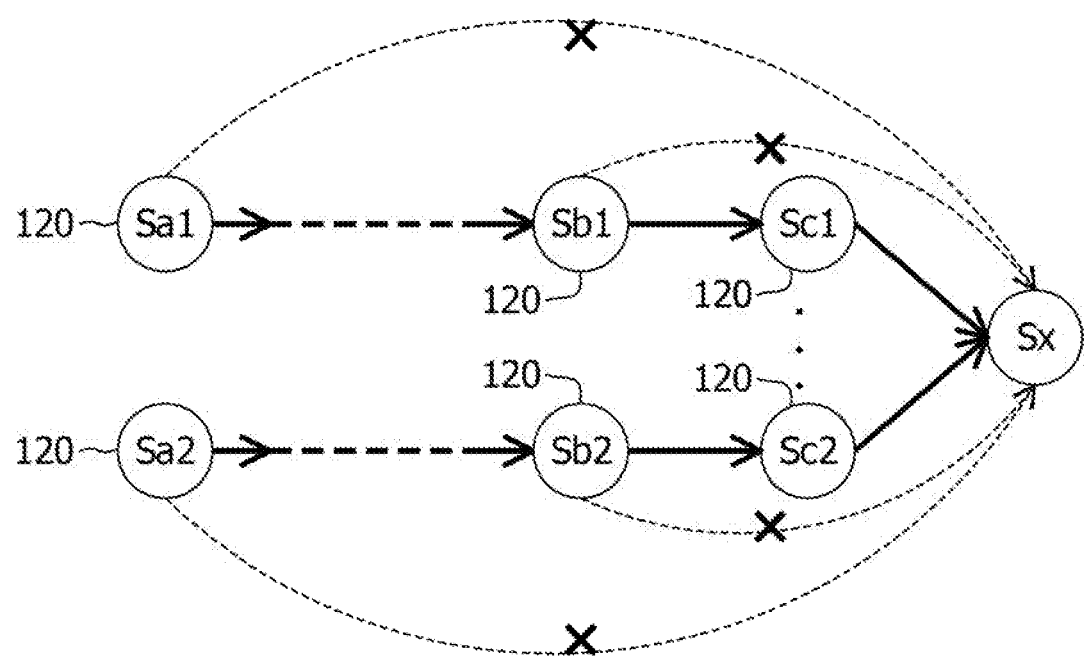
FIG. 6 is a diagram describing messaging in the case where a large number of services are deployed in the message control system illustrated in FIG. 1.

FIG. 6 is a diagram describing messaging in the case where a large number of services 120 are deployed in the message control system 100 illustrated in FIG. 1.

The procedure described with reference to FIG. 5 is applicable to an arbitrary path length and an arbitrary number of paths, as illustrated in FIG. 6.

As illustrated in FIG. 6, for example, communication from a service Sa1 to a service Sx and communication from a service Sb1 to the service Sx may be deleted and integrated with communication via the services Sa1 and Sb1 and a service Sc1. For example, communication from a service Sa2 to the service Sx and communication from a service Sb2 to the service Sx may be deleted and integrated with communication via the services Sa2 and Sb2 and a service Sc2.

Figure 7:
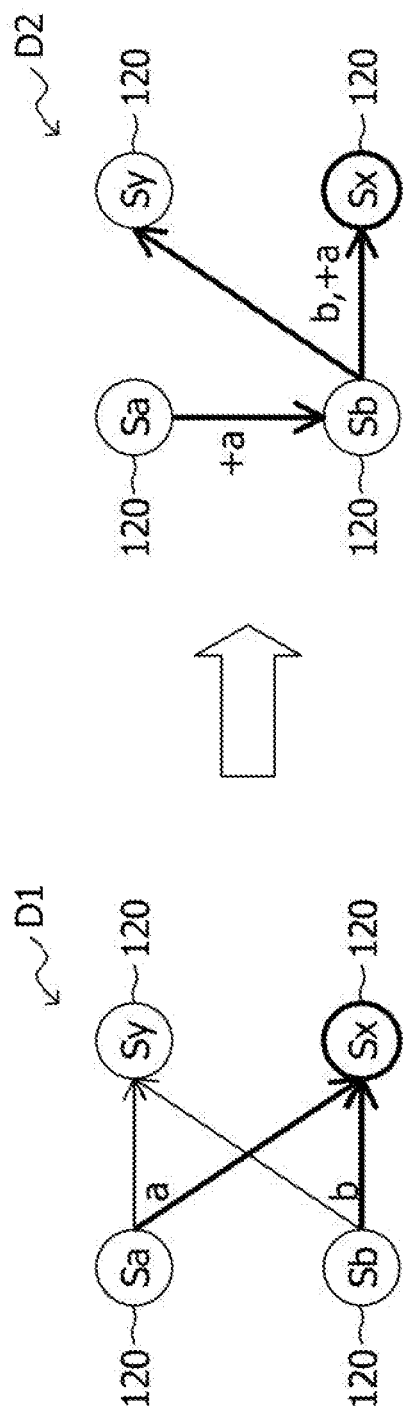
FIG. 7 is a diagram describing messaging in the case where a fourth service is added to the message control system illustrated in FIG. 1.

FIG. 7 is a diagram describing messaging in the case where a fourth service 120 is added to the message control system 100 illustrated in FIG. 1.

Even when a message flow does not exist between deployed services 120, a service Sy that receives the same message set as the added service Sx exists, the number of message flows in the entire system and the number of times that synchronization is executed in the entire system may be reduced by adding a new integrated message flow.

As indicated by reference sign D1, the new service Sx is added to the deployed services Sa, Sb, and Sy. Thus, not only the communication of a message a from the service Sa to the service Sy and the communication of a message b from the service Sb to the service Sy but also the communication of the message a from the service Sa to the service Sx and the communication of the message b from the service Sb to the service Sy are defined. The number of times that communication is executed between all the services 120 is 4.

As indicated by reference sign D2, since integrated messages are used, the communication of an integrated message+a from the service Sa to the service Sb and the communication of the integrated message+a and an integrated message b from the service Sb to the services Sy and Sx are defined. Therefore, the number of times that communication is executed between all the services 120 may be reduced to 3.

For example, when a new service 120 is added to the message control system 100, the message integration processing section 112 changes a transmission destination of an integrated message so that the number of times that communication is executed between the plurality of services 120 is reduced.

Figure 8:
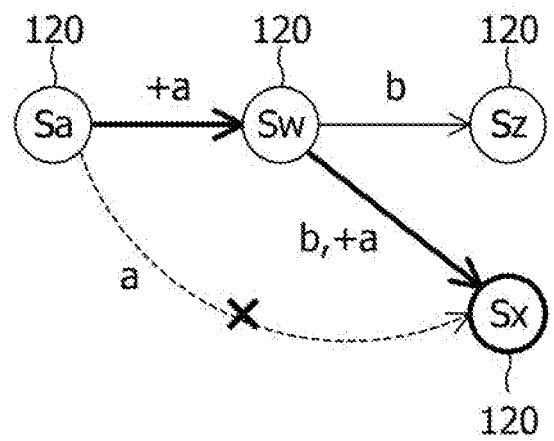
FIG. 8 is a diagram describing messaging in the case where a plurality of transmission destinations exist in the message control system illustrated in FIG. 1.

FIG. 8 is a diagram describing messaging in the case where a plurality of transmission destinations exist in the message control system 100 illustrated in FIG. 1.

When the plurality of transmission destinations exist, the entire amount of communication may be reduced by transmitting an integrated message obtained by integrating the messages to a transmission destination having a path to a service 120 that uses the integrated message.

In the example illustrated in FIG. 8, services Sa, Sw, Sz, and Sx are deployed. In this example, the messages are separately transmitted from the service Sw to the services Sz and Sx, and the messages to be transmitted to the service Sx are set to the integrated messages b and +a.

For example, when a plurality of services 120 that use a message to be transmitted exist, the message integration processing section 112 sets, to a transmission destination of the message to be transmitted, another service 120 having a communication path to two or more services 120 among the plurality of services 120.

Figure 9:
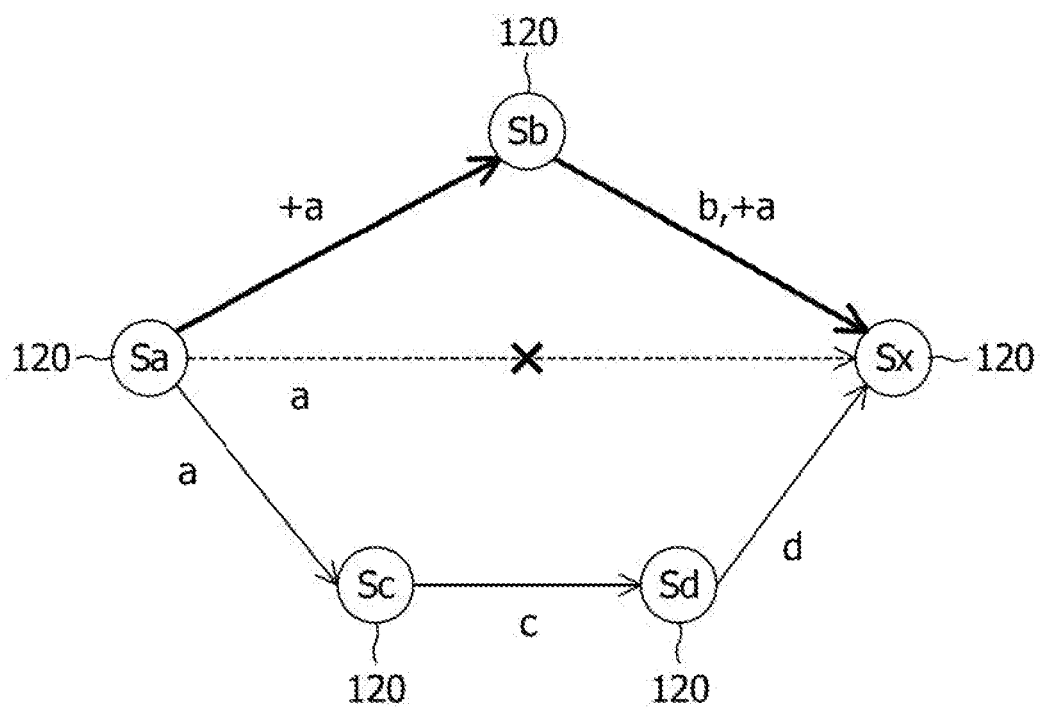
FIG. 9 is a diagram describing messaging in the case where a plurality of flows exist in the message control system illustrated in FIG. 1.

FIG. 9 is a diagram describing messaging in the case where a plurality of flows exist in the message control system 100 illustrated in FIG. 1.

When the plurality of flows of integrated messages exist, a flow via a path having the shortest path length is selected. This may reduce the entire amount of communication.

In the example illustrated in FIG. 9, services Sa, Sb, Sc, Sd, and Sx are deployed. While a path length for communication from the service Sa to the service Sx via the service Sb is 2, a path length for communication from the service Sa to the service Sx via the services Sc and Sd is 3. Communication via the service Sb in a path with a short path length is selected and an integrated message is transmitted via the path.

For example, when a plurality of communication paths exist as communication paths for a message to be transmitted, the message integration processing section 112 sets, to a transmission destination of the message to be transmitted, a service 120 coupled to a communication path with the shortest path length among the plurality of communication paths.

[A-2] Operation Example

Figure 10:
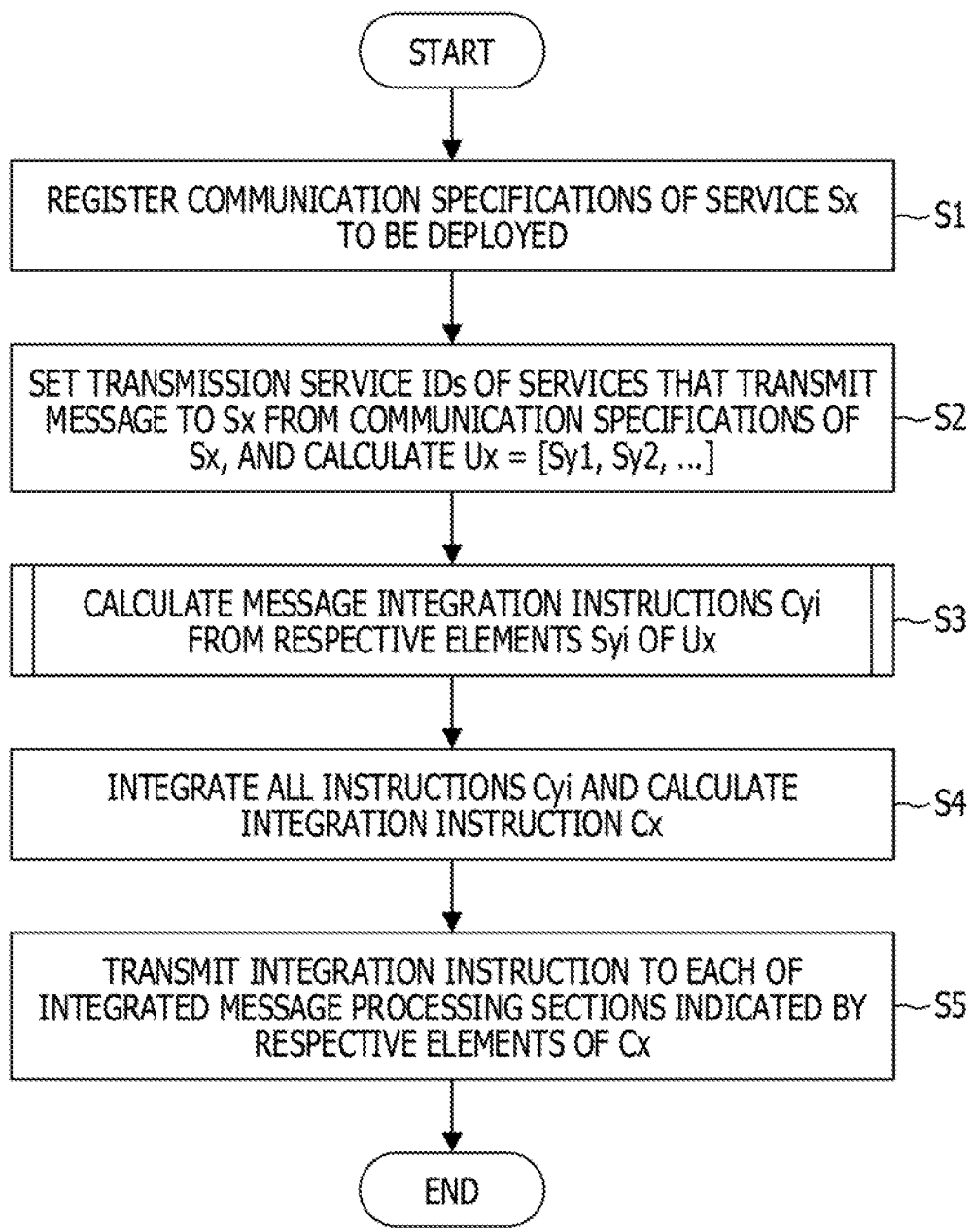
FIG. 10 is a flowchart describing a message integration instruction process by a message managing section illustrated in FIG. 1.

A message integration instruction process by the message managing section 210 illustrated in FIG. 1 is described based on a flowchart (of steps S1 to S5) illustrated in FIG. 10 with reference to tables illustrated in FIGS. 11 and 12. FIG. 11 illustrates the table exemplifying communication specifications of a service 120 in the message control system 100 illustrated in FIG. 1. FIG. 12 illustrates the table indicating message integration instruction information in the message control system 100 illustrated in FIG. 1.

The service communication managing section 212 receives communication specifications of a service Sx to be deployed and registers the communication specifications in the storage device 14 (refer to FIG. 2) in the deployment of the service (in step S1).

As illustrated in FIG. 11, the communication specifications indicate data received and to be transmitted by the service 120 identified by a service ID. IDs are set in the received data and the data to be transmitted, respectively. The ID of the service 120 that transmits the received data is defined in the received data. The communication specifications may be generated by a provider of the service 120.

The message integration computing section 211 calculates, based on the communication specifications of the service Sx, a set Ux=[Sy1, Sy2, . . . ] of service IDs to be transmitted to the service Sx (in step S2). The service IDs correspond to transmission service IDs of the communication specifications illustrated in FIG. 11.

The message integration computing section 211 calculates message integration instructions Cyi from respective elements Syi of Ux (in step S3). A process of calculating the message integration instructions in step S3 is described later in detail with reference to FIG. 13.

As illustrated in FIG. 12, the message integration instruction information includes one or more IDs of one or more message processing sections 110 targeted for an instruction and one or more message integration instructions. The one or more message integration instructions indicate a method of organizing messages received and to be transmitted by the service 120.

The message integration computing section 211 integrates all the message integration instructions Cy calculated for the respective elements Syi and calculates a message integration instruction Cx (in step S4).

The message integration computing section 211 transmits the message integration instruction Cx to each of the message processing sections 110 in accordance with details of the message integration instruction Cx (in step S5). Then, the message integration instruction process executed by the message managing section 210 is terminated.

Next, the process of calculating the message integration instructions in step S3 illustrated in FIG. 10 is described in detail with reference to a flowchart (of steps S301 to S305) illustrated in FIG. 13.

The message integration computing section 211 acquires communication specifications of the service Sy from the service communication managing section 212 (in step S301).

The message integration computing section 211 calculates, from the communication specifications of the service Sx, a set Uy=[Sz1, Sz2, ... ] of transmission service IDs of services that transmit a message to Sy (in step S302).

The message integration computing section 211 calculates a set Uyx of transmission service IDs that are service IDs included in both Uy calculated in step S302 and Ux calculated in step S2 illustrated in FIG. 10 (in step S303).

The message integration computing section 211 calculates message integration instructions Czi from elements Szi of Uyx (in step S304).

A process of generating the message integration instructions in step S304 is described later in detail with reference to FIG. 14. The message integration instructions Czi may be data illustrated in FIG. 12.

The message integration computing section 211 calculates an integration instruction Cy obtained by integrating all the message integration instructions Czi (in step S305). Then, the process of calculating the message integration instructions is terminated.

Figure 13:
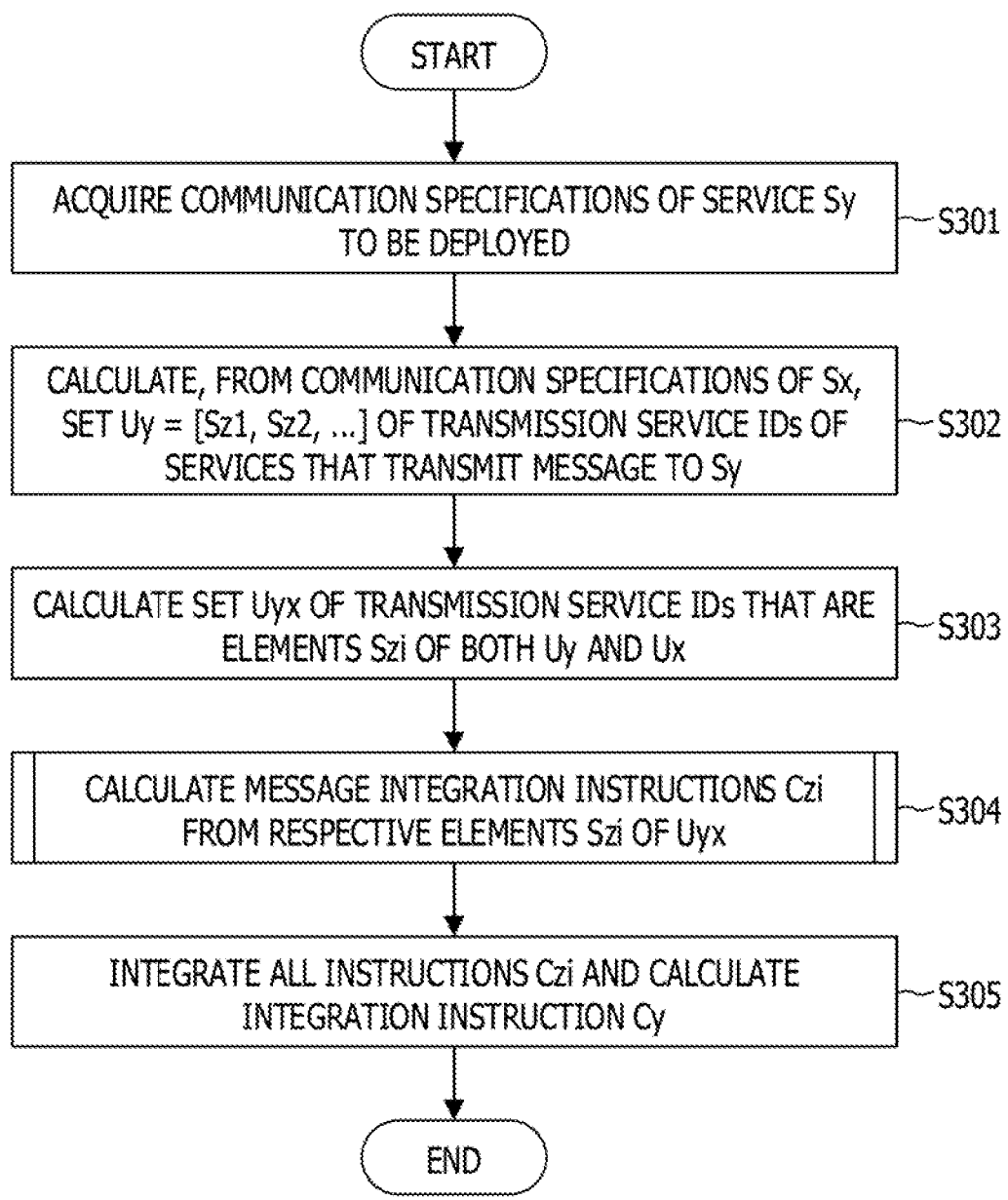
FIG. 13 is a flowchart describing details of a process of calculating message integration instructions in step S3 illustrated in FIG. 10.
Figure 14:
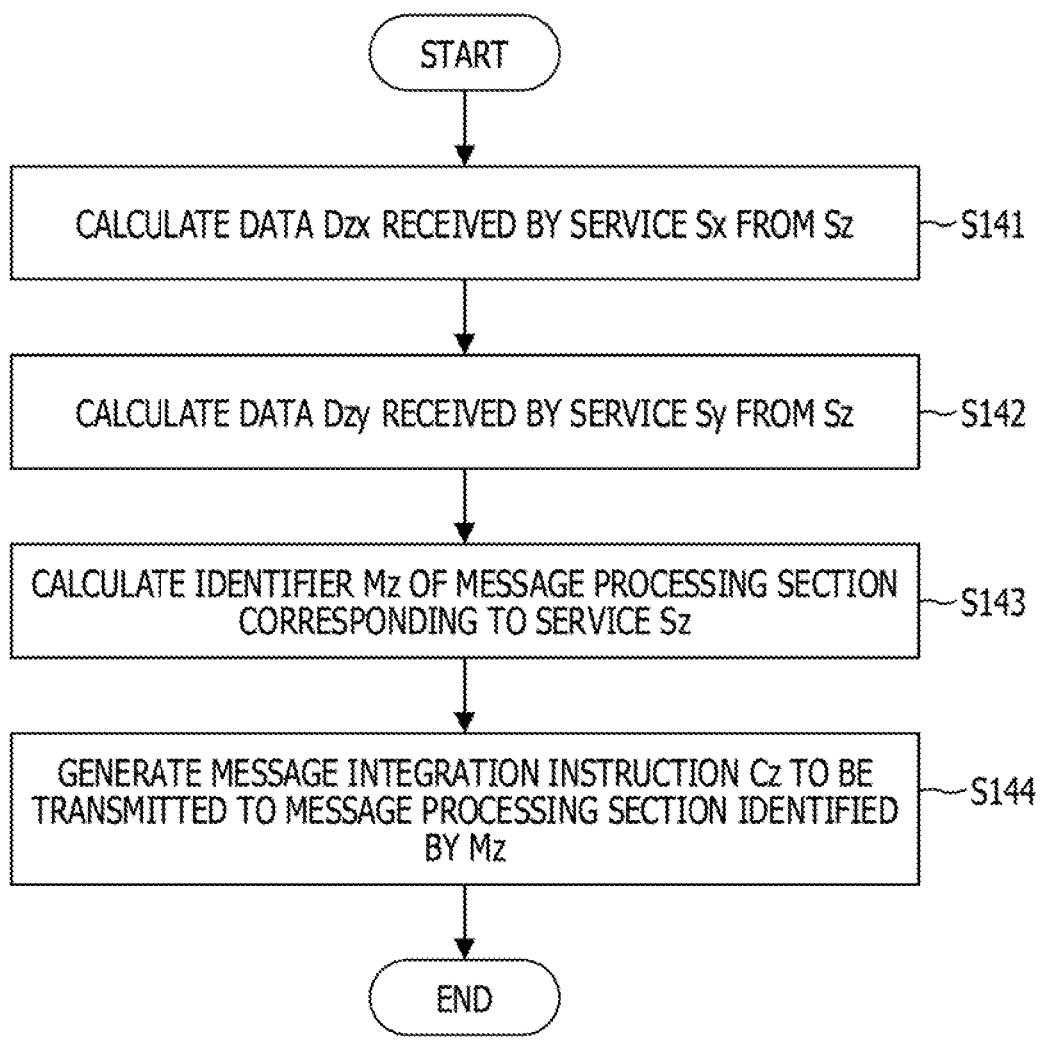
FIG. 14 is a flowchart describing details of a process of generating message integration instructions in step S304 illustrated in FIG. 13.

Next, the process of generating the message integration Instructions in step S304 illustrated in FIG. 13 is described in detail based on a flowchart (of steps S141 to S144) illustrated in FIG. 14 with reference to tables illustrated in FIGS. 15 and 16. FIG. 15 illustrates the table exemplifying association management information in the message control system 100 illustrated in FIG. 1. FIG. 16 illustrates the table indicating details of a message integration instruction in the message control system 100 illustrated in FIG. 1.

The message integration computing section 211 calculates data Dzx received by the service Sx from the service Sz (in step S141). The data Dzx is data IDs indicated by reception of the communication specifications of the service Sx and transmission of the communication specifications of the service Sz.

The message integration computing section 211 calculates data Dzy received by the service Sy from the service Sz (in step S142).

The message integration computing section 211 calculates an identifier Mz of a message processing section 110 corresponding to the service Sz (in step S143).

As illustrated in FIG. 15, associations between the services 120 and the message processing sections 110 are defined in the association management information. The service communication managing section 212 associates the IDs of the services 120 with the IDs of the message processing sections 110 in the deployment of the services. The service communication managing section 212 manages the association management information illustrated in FIG. 15. The message integration computing section 211 acquires the identifier Mz of the message processing section 110 corresponding to the service Sz from the service communication managing section 212.

The message integration computing section 211 generates a message integration instruction Cz to be transmitted to the message processing section 110 identified by the identifier Mz (in step S144). Then, the process of generating the message integration instructions is terminated.

As exemplified in FIG. 16, the message integration instruction Cz Indicates data IDs, integration destination data IDs, and integration data IDs for data indicated by the transmission of the communication specifications of the service Sz.

For example, when data a of the service Sz is integrated with data b and is to be transmitted together with the data b, integration destination data of the data a is the data b, and integration data of the data b is the data a. According to a format illustrated in FIG. 16, when the data a of the service Sz is integrated with the data b and is to be transmitted together with the data b, the message integration instruction Cz is expressed by (data a, data b, –) and (data b, –, data a). A sign (*) that indicates unspecified may be specified as an integration data ID.

The message integration instruction Cz generated in step S144 is expressed by (data Dzx, data Dzy, –) and (data Dzy, –, data Dzx).

Figure 17:
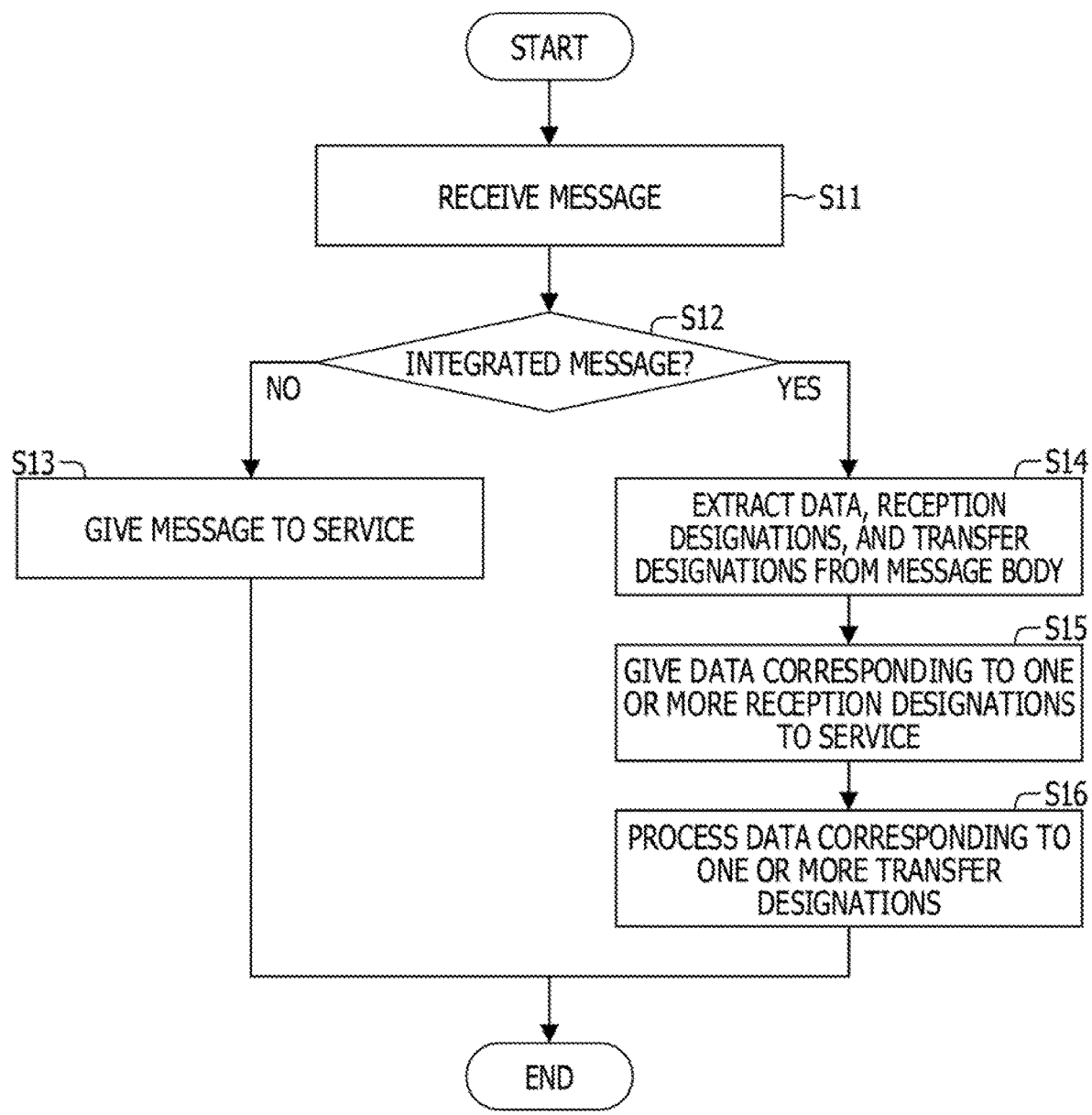
FIG. 17 is a flowchart describing a message reception process by a message processing section illustrated in FIG. 1.
Figure 18:
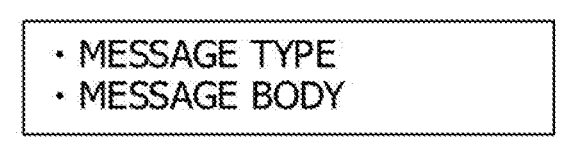
Figure 19:
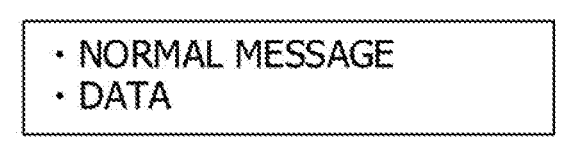

Next, a message reception process by the message processing section 110 illustrated in FIG. 1 is described based on a flowchart (of steps S11 to S16) illustrated in FIG. 17 with reference to tables illustrated in FIGS. 18 to 20. FIG. 18 illustrates the table indicating a message in the message control system 100 illustrated in FIG. 1. FIG. 19 illustrates the table indicating a normal message in the message control system 100 illustrated in FIG. 1. FIG. 20 illustrates the table indicating an integrated message in the message control system 100 illustrated in FIG. 1.

The integrated message determining section 114 receives a message from the network 3 (in step S11).

The integrated message determining section 114 determines whether the received message is an integrated message (in step S12).

As illustrated in FIG. 18, the message includes a message type indicating whether the message is a normal message or an integrated message and a message body indicating details of the message.

As illustrated in FIG. 19, the message body of the normal message is data.

On the other hand, as illustrated in FIG. 20, the message body of the integrated message includes data, one or more reception designations, and one or more transfer designations. The one or more reception designations and the one or more transfer designations may indicate truth values. When a reception designation indicates true, data corresponding to the reception destination indicates data received by a service 120. When a transfer designation indicates true, data corresponding to the transfer designation indicates data to be transmitted as an integrated message from the service 120 to a subsequent service 120.

When the received message is not the integrated message (or is the normal message) (No in step S12), the received message transferring section 115 gives the message to the service 120 (in step S13). Then, the message reception process is terminated.

On the other hand, when the received message is the integrated message (Yes in step S12), the integrated message decomposing section 113 extracts data, reception designations, and transfer designations from the message body of the received message (in step S14).

When the received message transferring section 115 gives data corresponding to one or more reception designations indicating true among the reception designations to the service 120 (in step S15).

The message integration processing section 112 processes data corresponding to one or more transfer designations indicating true among the transfer designations (in step S16). Then, the message reception process is terminated. After that, a message transmission process that will be described with reference to FIG. 21 is executed.

Figure 21:
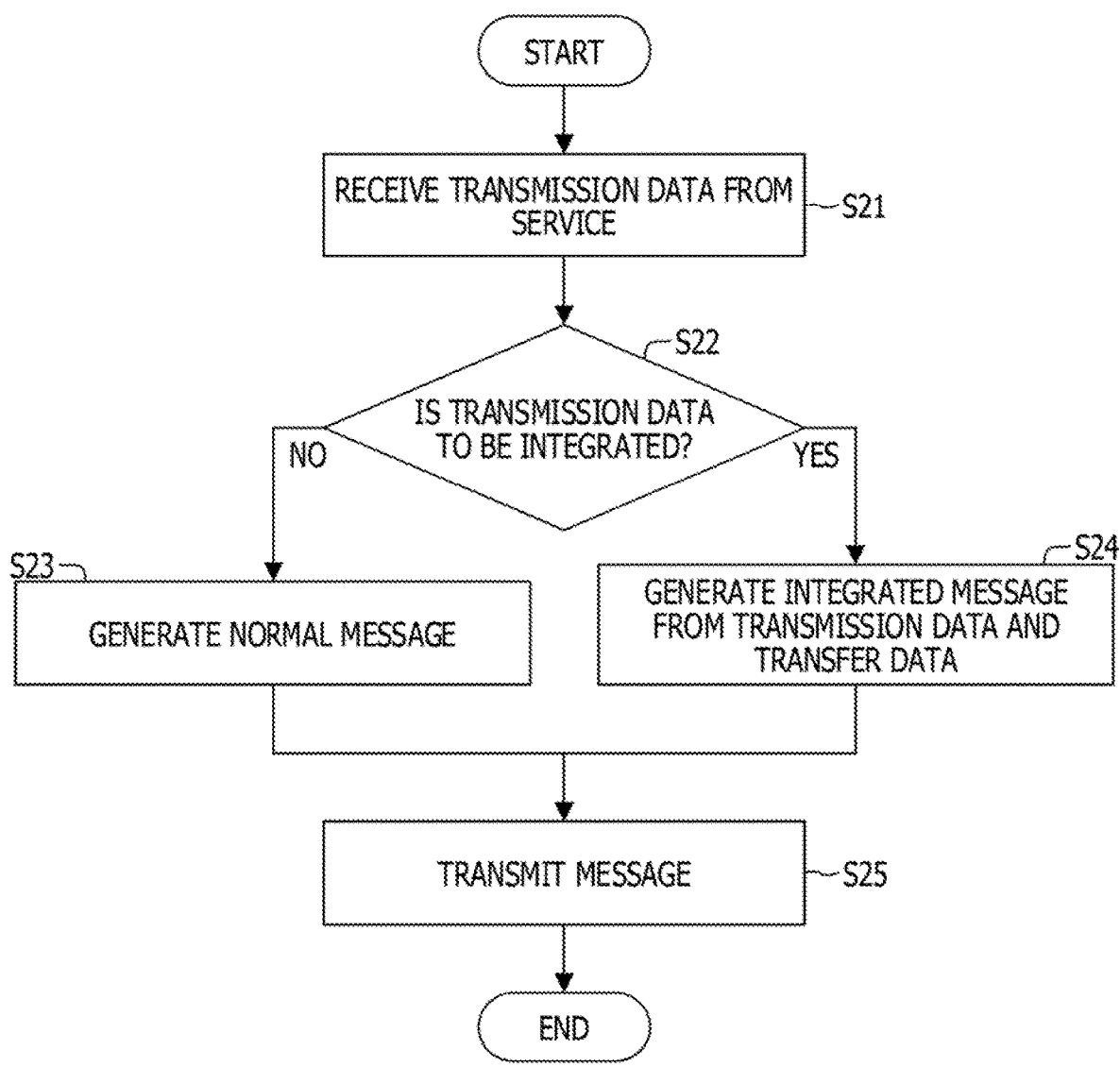
FIG. 21 is a flowchart describing a message transmission process by the message processing section illustrated in FIG. 1.

Next, the message transmission process by the message processing section 110 illustrated in FIG. 1 is described based on a flowchart (of steps S21 to S25) illustrated in FIG. 21.

The message integration processing section 112 receives transmission data Ds from the service 120 (in step S21).

The message integration processing section 112 determines, based on a message integration instruction (refer to FIG. 16) received from the message managing section 210, whether the transmission data Ds is to be integrated (in step S22).

When the transmission data Ds is not to be integrated (No in step S22), the message integration processing section 112 generates a normal message (in step S23) and causes the process to proceed to step S25.

On the other hand, when the transmission data Ds is to be integrated (Yes in step S22), the message integration processing section 112 generates an integrated message from the transmission data Ds and transfer data Dt (in step S24).

When an integration data designation is set for the transmission data Ds, and the message integration processing section 112 holds the designated data Dt as transfer data, the message integration processing section 112 generates the integrated message from the transmission data Ds and the transfer data Dt. When the message integration processing section 112 does not hold the transfer data Dt, the message integration processing section 112 holds the transmission data Ds as data waiting to be transmitted without transmitting the transmission data Ds. The transmission data Ds is transmitted as an integrated message when the concerned transfer data Dt is given in the foregoing process of step S16 illustrated in FIG. 17.

In the case where data Du is set as an integration destination data designation of the transmission data Ds, the message integration processing section 112 holds the data Du without transmitting the data Du to an external. Therefore, in the case where the data Du is set as the integration destination data designation for the transmission data Ds, whether integration destination data Du is already transmitted from the service 120 may be checked by determining whether the message integration processing section 112 holds the data Du or not. When the integration destination data Du is already transmitted or when the message integration processing section 112 holds the data Du, the message integration processing section 112 generates an integrated message from the data Du and Ds and discards the held data Du. When the integration destination data Du is not yet transmitted or when the message integration processing section 112 does not hold the data Du, the message integration processing section 112 holds the data Ds as data waiting to be transmitted without transmitting the data Ds to an external. The data Ds and the data Du are integrated into an integrated message and transmitted as the integrated message when the data Du is transmitted from the service 120.

The message integration processing section 112 transmits the message to a target service 120 (in step S25). Then, the message transmission process is terminated.

Figure 22:
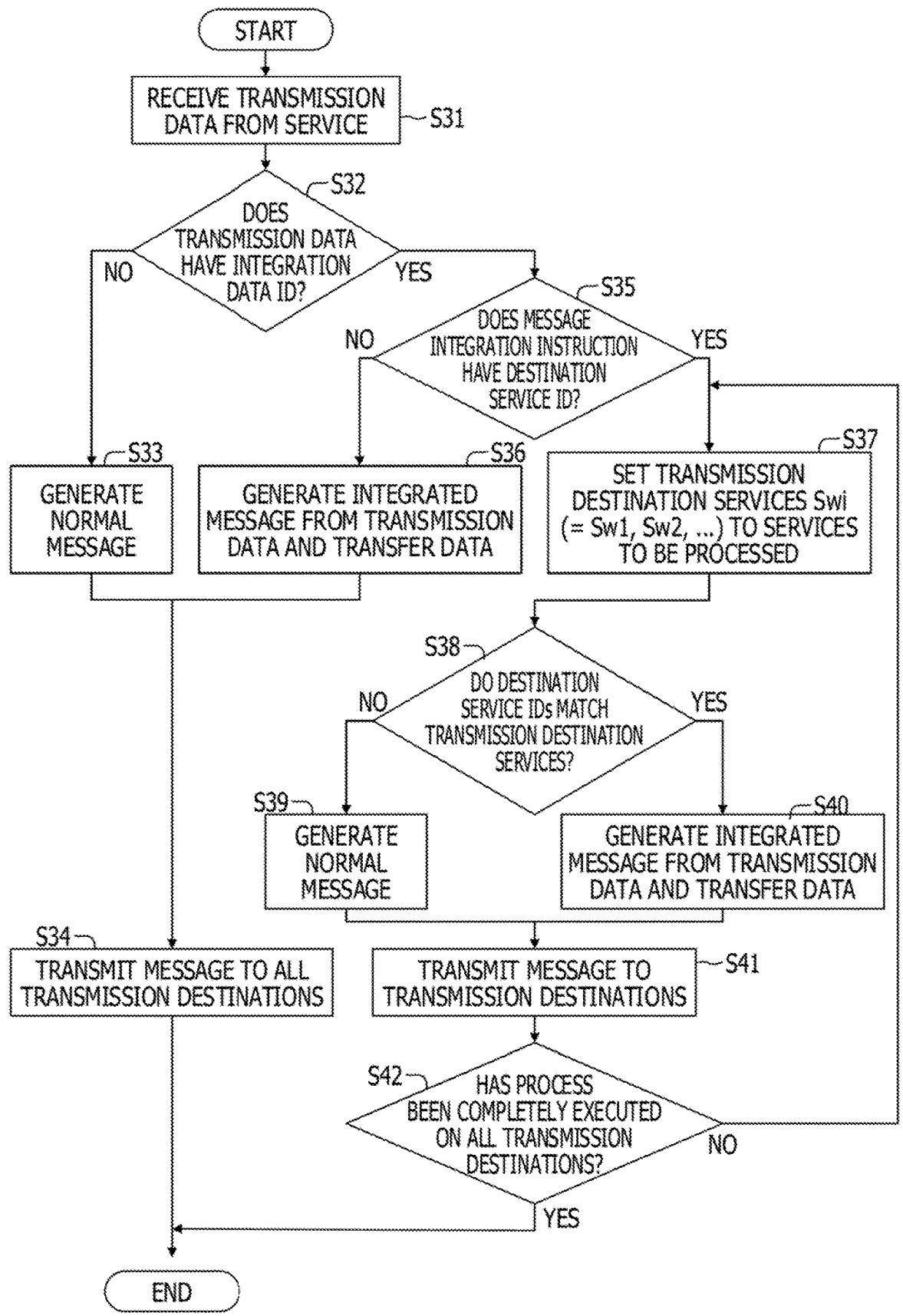
FIG. 22 is a flowchart describing a message transmission process by the message processing section illustrated in FIG. 1 in the case where a plurality of transmission destinations exist.

Next, a message transmission process to be executed by the message processing section 110 illustrated in FIG. 1 in the case where a plurality of transmission destinations exist is described based on a flowchart (of steps S31 to S42) illustrated in FIG. 22 with reference to tables illustrated in FIGS. 23 and 24. FIG. 23 illustrates the table indicating details of a message integration instruction in the case where a plurality of transmission destinations exist in the message control system 100 illustrated in FIG. 1. FIG. 24 illustrates the table Indicating an integrated message in the case where the plurality of transmission destinations exist in the message control system 100 illustrated in FIG. 1.

The message integration processing section 112 receives transmission data from the service 120 (in step S31).

The message integration processing section 112 determines, based on a message integration instruction, whether the transmission data has an integration data ID added thereto and is to be integrated (in step S32).

As illustrated in FIG. 23, the message integration instruction may be configured to further include a destination service ID in addition to a data ID, an integration destination data ID, and an integration data ID.

When the transmission data is not to be integrated (or does not have the integration data ID) (No in step S32), the message integration processing section 112 generates a normal message (in step S33).

The message integration processing section 112 transmits the message to all the transmission destinations (in step S34). Then, the message transmission process executed when the plurality of transmission destinations exist is terminated.

On the other hand, when the transmission data is to be integrated (or has the integration data ID) (Yes in step S32), the message integration processing section 112 determines whether the message integration instruction has destination service IDs added thereto (in step S35).

When the message integration instruction does not have the destination service IDs (No in step S35), the message integration processing section 112 generates an integrated message from the transmission data and transfer data (in step S36). Then, the process proceeds to step S34.

As illustrated in FIG. 24, the integrated message may be configured to further include a destination service ID in addition to data, a reception designation, and a transfer designation.

On the other hand, when the integrated message has the destination service IDs (Yes in step S35), the message integration processing section 112 acquires services Sw1, Sw2, . . . as the transmission destinations and executes the following process on the transmission destination services Swi (in step S37).

The message integration processing section 112 determines whether the destination service IDs of the message integration instruction match the transmission destination services Swi (in step S38).

When the destination service IDs do not match the transmission destination services Swi (No in step S38), the message integration processing section 112 generates a normal message from the transmission data (in step S39). Then, the process proceeds to step S41.

On the other hand, when the destination services ID match the transmission destination services Swi (Yes in step S38), the message integration processing section 112 generates an integrated message from the transmission data and the transfer data (in step S40).

As illustrated in FIG. 24, the integrated message may have data, a reception designation, a transfer designation, and a destination service ID.

The message integration processing section 112 transmits the message to services 120 indicated by the transmission destination services Swi (in step S41).

The message integration processing section 112 determines whether the message transmission process has been completely executed on all the transmission destinations (in step S42).

When the message transmission process has not been completely executed on all the transmission destinations (No in step S42), the process returns to step S37 to repeat the message transmission process.

On the other hand, when the message transmission process has been completely executed on all the transmission destinations (Yes in step S42), the message transmission process executed when the plurality of transmission destinations exist is terminated.

Figure 25:
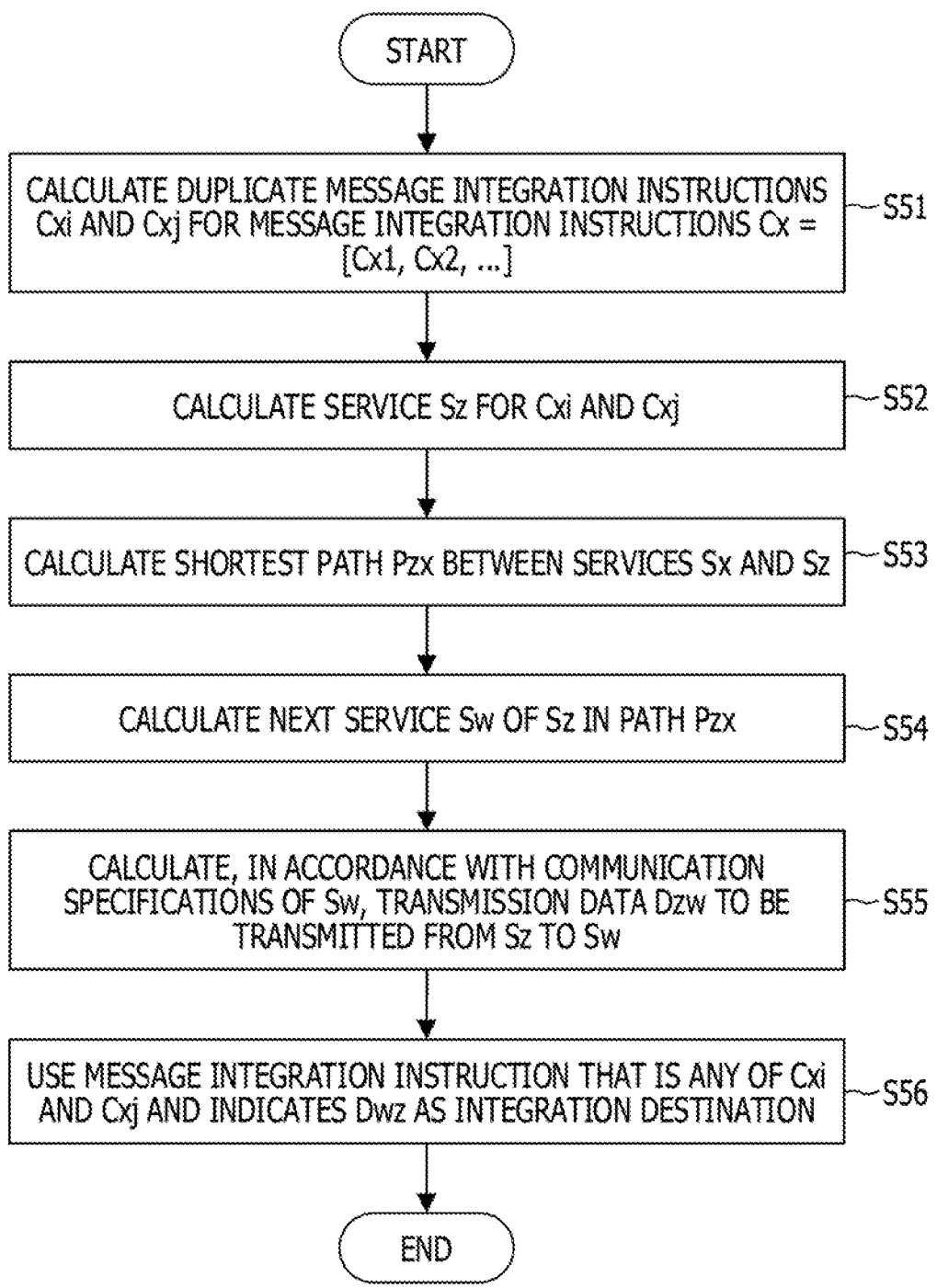
FIG. 25 is a flowchart describing a process of calculating a message integration instruction by the message managing section illustrated in FIG. 1 in the case where a plurality of flows exist.

Next, a process of calculating a message integration instruction by the message managing section 210 illustrated in FIG. 1 in the case where a plurality of flows exist is described based on a flowchart (of steps S51 to S56) illustrated in FIG. 25.

The message integration computing section 211 calculates duplicate message integration instructions Cxi and Cxj for message integration instructions Cx=[Cx1, Cx2, . . . ] (in step S51).

The message integration computing section 211 calculates a service Sz for the duplicate message integration instructions Cxi and Cxj (in step S52).

The message integration computing section 211 calculates the shortest path Pzx between the services Sx and Sz (in step S53).

The message integration computing section 211 calculates a next service Sw of the service Sz in the path Pzx (in step S54).

The message integration computing section 211 calculates, in accordance with communication specifications of the service Sw, transmission data Dzw to be transmitted from the service Sz to the service Sw (in step S55).

The message integration computing section 211 uses a message integration instruction that is any of the duplicate message integration instructions Cxi and Cxj and indicates the transmission data Dzw as an integration destination (in step S56). Then, the process of calculating the message integration instruction when the plurality of flows exist is terminated.

[A-3] Effects

In the message processing device 1 (message control system 100) according to the example of the embodiment described above, the following effects are exerted.

The message integration processing section 112 integrates a plurality of messages into a single message based on the relationships between the message transmission and reception by the services 120 and transmits the single message to the other message processing device 1. The integrated message decomposing section 113 receives and decomposes a message integrated by the other message processing device 1 into messages. Then, the message integration processing section 112 further integrates the decomposed messages and a new message into a message and transfers the message to the other message processing device 1.

This may reduce the cost of the messaging. For example, it may be possible to reduce the number of times that communication is executed and the number of times that synchronization is executed, reduce a delay, and improve the responsiveness of the message control system 100. Since a difference between arrival times of multiple data items may be minimized by using an integrated message, it may be possible to reduce the sizes of queues to be used for synchronization and reduce resources to be used to execute the message control system 100.

When a new service 120 is added to the message control system 100, the message integration processing section 112 changes a transmission destination of an integrated message so that the number of times that communication is executed between the plurality of services 120 is reduced.

This may reduce the cost of the messaging even when the new service 120 is added.

When a plurality of services 120 that use a message to be transmitted exist, the message integration processing section 112 treats, as a transmission destination of the message to be transmitted, other services 120 having a communication path to two or more services 120 among the plurality of services 120.

This may reduce the cost of the messaging even when a plurality of transmission destinations of a message exist.

When a plurality of communication paths exist as communication paths for a message to be transmitted, the message integration processing section 112 treats, as a transmission destination of the message to be transmitted, a service 120 coupled to a communication path having the shortest path length among the plurality of communication paths.

This may reduce the cost of the messaging even when a plurality of message flows to a transmission destination exist.

[B] Others

The techniques disclosed herein are not limited to the foregoing embodiment and may be variously modified and changed without departing from the gist of the embodiment. Each of the configurations described in the embodiment and each of the processes described in the embodiment may be selected. Alternatively, two or more of the configurations described in the embodiment may be combined, and two or more of the processes described in the embodiment may be combined.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
a memory; and
a processor coupled to the memory and configured to:
perform transmission and reception of messages via which a plurality of services coordinate with each other in a message control system,
integrate a plurality of messages into a first message, based on relationships between message transmission and message reception caused by the plurality of services, and transmit the first message to another information processing device in the message control system,
receive a second message integrated by the another information processing device, and decompose the received second message into messages including a third message, wherein
the processor further integrates the decomposed third message and a fourth message into a fifth message, and transfers the integrated fifth message to the another information processing device, wherein the processor is further configured to
receive a message integration instruction controlling processing of a plurality of messages transmitted by a service of the information processing device;
determine whether to integrate the received message based on the message integration instruction;

transmit an integrated message as the first message when the determining determines to integrate the received message, the integrated message including the received message and a sixth message; and transmit a normal message based on the received message when the determining determines not to integrate the received message, wherein the message integration instruction includes a destination service identifier, a data identifier, an integration destination data identifier, and an integration data identifier.

2. The information processing device of claim 1, wherein when a first service is added to the message control system, the processor changes a transmission destination of the first message to reduce a number of times communication is executed between the plurality of services.

3. The information processing device of claim 1, wherein when a plurality of first services that use the first message are provided in the message control system, the processor determines, as a transmission destination of the first message, a second service having a communication path to two or more services among the plurality of first services.

4. The information processing device of claim 1, wherein when a plurality of communication paths for transmitting the first message exist, the processor determines, as a transmission destination of the first message, a service coupled to a communication path having a shortest path length among the plurality of communication paths.

5. The information processing device of claim 1, wherein the perform transmission and reception of messages includes determining whether to decompose a received message for at least one of processing by a service of the information processing device and integration with another received message.

6. The information processing device of claim 1, wherein the integrate a plurality of messages into a first message includes integrating a received message with a previously received message when the previously received message is stored in the memory of the information processing device; and storing a received message for integration with a following received message when the previously received message is not stored in the memory.

7. A message control system comprising:

a plurality of information processing devices respectively associated with a plurality of services that coordinate with each other via transmission and reception of messages in the messages control system, each of the plurality of information processing device including a first processor; and a control device including a second processor configured to cause a first information processing device among the plurality of information processing devices to:

integrate a plurality of messages into a first message, based on relationships between message transmission and message reception caused by the plurality of services, and transmit the first message to a second information processing device among the plurality of information processing devices, wherein the first processor of the first information processing device is configured to:

transmit the first message to the second information processing device according to an instruction from the control device, receive a second message integrated by a third information processing device among the plurality of information processing devices, and decompose the received second message into messages including a third message, integrate the decomposed third message and a fourth message into a fifth message, and transfers the integrated fifth message to a fourth information processing device among the plurality of information processing devices, wherein the first processor is further configured to receive a message integration instruction controlling processing of a plurality of messages transmitted by a service of the information processing device, determine whether to integrate the received message based on the message integration instruction, transmit an integrated message as the first message when the determining determines to integrate the received message, the integrated message including the received message and a sixth message, and transmit a normal message based on the received message when the determining determines not to integrate the received message, wherein the message integration instruction includes a destination service identifier, a data identifier, an integration destination data identifier, and an integration data identifier.

8. The message control system of claim 7, wherein when a first service is added to the message control system, the first processor changes a transmission destination of the first message to reduce a number of times communication is executed between the plurality of services.

9. The message control system of claim 7, wherein when a plurality of first services that use the first message are provided in the message control system, the first processor determines, as a transmission destination of the first message, a second service having a communication path to two or more services among the plurality of first services.

10. The message control system of claim 7, wherein when a plurality of communication paths for transmitting the first message exist, the processor determines, as a transmission destination of the first message, a service coupled to a communication path having a shortest path length among the plurality of communication paths.

11. The message control system of claim 7, wherein the control device is further configured to:

receive respective communication specifications from the plurality of information processing devices respectively associated with the plurality of services; and generate at least one message integration instruction that is transmitted to the first information processing device to control the integration of messages transmitted by a respective service of the first information processing device.

12. The message control system of claim 11, wherein the at least one message integration instruction includes at least one of a destination service identifier, a data identifier, an integration destination data identifier, and an integration data identifier.

13. The message control system of claim 7, wherein the first processor of the first information processing device is further configured to determine whether to decompose a received message for at least one of processing by a service of the first information processing device and integration with another received message.

14. The message control system of claim 7, wherein the integrate a plurality of messages into a first message that is performed by the first information processing device includes:
   integrating a received message with a previously received message when the previously received message is stored in the first information processing device; and
   storing a received message for integration with a following received message when the previously received message is not stored in the first information processing device.

15. A non-transitory, computer-readable recording medium having stored therein a program for causing a computer to execute a process comprising:
   performing transmission and reception of messages via which a plurality of services coordinate with each other in a message control system;
   integrating a plurality of messages into a first message, based on relationships between message transmission and message reception caused by the plurality of services, and transmitting the first message to another information processing device in the message control system;
   receiving a second message integrated by the another information processing device;
   integrating the decomposed third message and a fourth message into a fifth message, and transferring the integrated fifth message to the another information processing device receiving a message integration instruction controlling processing of a plurality of messages transmitted by a service of the information processing device;
   determining whether to integrate the received message based on the message integration instruction;
   transmitting an integrated message as the first message when the determining determines to integrate the received message, the integrated message including the received message and a sixth message; and
   transmitting a normal message based on the received message when the determining determines not to integrate the received message,
   wherein the message integration instruction includes a destination service identifier, a data identifier, an integration destination data identifier, and an integration data identifier.

16. The non-transitory, computer-readable recording medium of claim 15, the process further comprising:
   when a first service is added to the message control system, changing a transmission destination of the first message to reduce a number of times communication is executed between the plurality of services.

17. The non-transitory, computer-readable recording medium of claim 15, the process further comprising:
   when a plurality of first services that use the first message are provided in the message control system, determining, as a transmission destination of the first message, a second service having a communication path to two or more services among the plurality of first services.

18. The non-transitory, computer-readable recording medium of claim 15, the process further comprising:
   when a plurality of communication paths for transmitting the first message exist, determining, as a transmission destination of the first message, a service coupled to a communication path having a shortest path length among the plurality of communication paths.

* * * * *